UNITED STATES PATENT OFFICE.

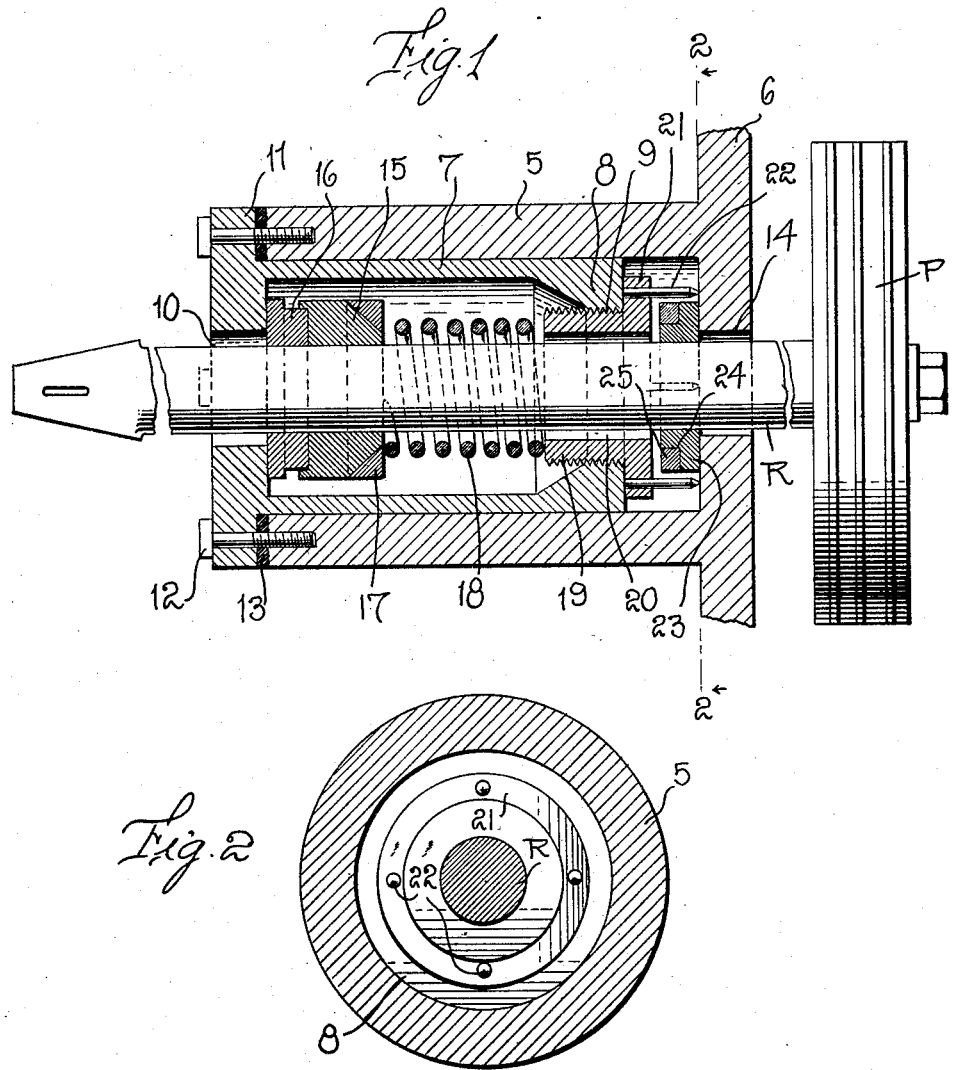

WALTER N. LANDMESSER, OF OSKALOOSA, IOWA.

STUFFING-BOX.

1,274,564.  Specification of Letters Patent.  Patented Aug. 6, 1918.

Application filed March 14, 1918. Serial No. 222,367.

*To all whom it may concern:*

Be it known that I, WALTER N. LANDMESSER, a citizen of the United States, residing at Oskaloosa, in the county of Mahaska and State of Iowa, have invented certain new and useful Improvements in Stuffing-Boxes, of which the following is a specification, reference being had to the accompanying drawings.

This invention relates to an improved stuffing box for engine cylinders and the like, and has for its primary object to provide means which will effectually prevent the escape of steam or other motive fluid from the cylinder and around the piston rod, while at the same time the piston may have a limited vibratory movement in the stuffing box.

It is also another important object of the invention, to provide means for preventing rotation of the compression nut for the packing spring arranged within the stuffing box.

The invention likewise has for an additional object to provide a relatively movable ground joint ring arranged on the piston rod between the compression nut and the cylinder head, which is urged against the face of the nut in the movement of the piston in each direction to prevent the escape of the fluid through the bore of the nut.

And it is a further general object of the invention to provide a device for the above purpose which is relatively simple in its construction, reliable and effective in practical use and capable of manufacture at relatively small cost.

With the above and other objects in view the invention consists in the improved construction, combination and relative arrangement of the several parts as will be hereinafter more fully described, subsequently claimed, and illustrated in the accompanying drawings, in which similar reference characters designate corresponding parts throughout the several views and wherein:

Figure 1 is a longitudinal sectional view illustrating the preferred embodiment of my improved stuffing box; and Fig. 2 is a section taken on the line 2—2 of Fig. 1.

Referring in detail to the drawing, 5 designates the cylindrical body wall of the stuffing box projecting from the cylinder head 6 and which may either be integral with said head, as shown, or may constitute a separate part and be fixed to the head 6 by any suitable means.

A shell or housing 7 is adapted to be inserted within the box 5, said shell being of slightly less length than the length of the stuffing box and has its wall thickened at one end to form an inwardly projecting annular flange 8 threaded as at 9. At its other end the shell 7 is provided with an opening shown at 10 for the piston rod, and is also formed with an outwardly projecting annular flange 11 which is provided with a plurality of spaced openings to receive the attaching bolts 12 which have threaded engagement in longitudinal bores in the end of the wall 5. A packing ring or gasket 13 is interposed between the end of this wall and the opposed face of the flange 11.

P designates a piston operating within the cylinder and R the piston rod which extends through an opening 14 in the cylinder head and through the opening 10 in the end wall of the shell 7. These openings 10 and 14 are of appreciably greater diameter than the piston rod R so as to permit of a limited vibratory movement of the piston rod. Within the shell 7, suitable packing means indicated generally by the numeral 15 is engaged upon the piston rod. While this packing means may be of any approved form or construction, as herein shown, the packing includes a flanged disk 16 and a seating ring or collar 17 within which the packing material is engaged. A coil spring 18 surrounding the piston rod bears at one of its ends against the ring 17 and urges the flanged disk 16 into tight engagement against the inner face of the end wall of the shell 7 around the opening 10 therein.

A compression nut 19 is engaged in the threaded flange 8 on the inner end of the shell 7, and this nut coacting with the other end of the spring 18 places the latter under the desired compression. The bore 20 of the compression nut 19 is likewise relatively large so as to permit of the vibratory movement of the piston rod. This nut is formed on one end with an outwardly projecting annular flange 21 for engagement against the inner end face of the shell 7 and in this flange a plurality of spaced longitudinally projecting pins 22 are fixed at one of their ends. The other ends of these pins are tapered or pointed for biting engagement in the cylinder head at the inner end of the body wall 5 when the clamping bolts 12 are tightened. In this manner, rotation of the compression nut due to vibration, is obviated and the packing spring 18 is thus maintained under the desired compression.

A ground joint ring 23 is loosely engaged upon the piston rod 10 for free turning movement between the flange 21 of the compression nut and the cylinder head and is also capable of a slight longitudinal movement on the piston rod. This ring on one face and at its outer edge is rabbeted, as shown at 24, to receive a renewable metal annulus 25 which is adapted for frictional engagement with the end face of the compression nut.

In the operation of the device, when steam is admitted to the outer end of the piston cylinder to drive the piston in one direction, the steam entering through the opening 14 in the cylinder head forces the ground joint ring 24 outwardly on the piston rod to tightly engage the annulus 25 with the face of the nut and prevent the passage of live steam through the nut bore to the interior of the shell 7. When this steam pressure is released and the steam is admitted to the opposite end of the cylinder to reverse the piston stroke, the ring 24 will be released momentarily from the influence of such pressure, but as the movement of the piston continues, in expelling the steam behind the piston, pressure will again be created against the ring 24 to retain said ring to its effective position. Thus it will be seen that I have devised an improved stuffing box wherein the piston rod may have a slight vibratory movement without causing undue wear or injury to the parts of the packing. The packing is also rendered more effective by the compression nut above referred to and the means which I have devised for holding said nut against turning movement. The several parts of the improved stuffing box can be easily and quickly assembled or disassembled, and as they are all of very simple form, it is apparent that the device can be produced at relatively small manufacturing cost.

While I have herein shown, and described the preferred construction and arrangement of the several elements of the device it is nevertheless to be understood that the same are susceptible of considerable modification, and I therefore reserve the privilege of adopting all such legitimate changes as may be fairly embodied within the spirit and scope of the invention as claimed.

I claim:—

1. In a stuffing box for piston cylinders, the combination with the body wall projecting from the cylinder head, of a shell disposed within the projecting wall, packing means within said shell including a spring, a compression nut threaded in the inner end of the shell and coacting with the spring, and means loosely engaged on the piston rod between said nut and the cylinder head and urged against the face of the nut in the movement of the piston in one direction by fluid pressure entering the end of the stuffing box.

2. In a stuffing box for piston cylinders, the combination with the body wall projecting from the cylinder head, of a shell disposed within the projecting wall box and having an opening in one end for the piston rod, packing means within said shell including a spring, a compression nut threaded in the other end of the shell and coacting with the spring, and a plurality of longitudinally projecting pins fixed in the nut and having biting engagement in the wall of the cylinder head to prevent rotation of the nut in the vibration of the piston rod.

3. In a stuffing box for piston cylinders, the combination with the body wall projecting from the cylinder head, of a shell disposed within the projecting wall and having an opening in one end for the piston rod, packing means within said shell including a spring, a compression nut threaded in the other end of the shell and coacting with the spring, and a plurality of longitudinally projecting pins fixed in the nut and having biting engagement in the wall of the cylinder head to prevent rotation of the nut in the vibration of the piston rod, and means loosely engaged on the piston rod between said nut and the cylinder head and urged against the face of the nut in the movement of the piston in each direction by fluid pressure entering the end of the stuffing box.

4. In a stuffing box for piston cylinders, the combination with the body wall projecting from the cylinder head, of a shell disposed within the projecting wall and having an opening in one end for the piston rod, packing means within said shell including a spring, a compression nut threaded in the other end of the shell and coacting with the spring, a plurality of longitudinally projecting pins fixed in the nut and having biting engagement in the wall of the cylinder head to prevent rotation of the nut in the vibration of the piston rod, a ring loosely engaged upon the piston rod between the nut and the wall of the cylinder head, and a renewable metal annulus carried by said ring and movable with the ring into engagement with the face of the nut by the fluid pressure entering the stuffing box from the cylinder.

5. In a stuffing box for piston cylinders, a cylindrical body wall projecting from the cylinder head, a shell engaged within the stuffing box and having a flange on one end, clamping bolts in said flange for threaded engagement in the body wall, the said end of the shell having an opening therein to accommodate the piston rod, packing means within the shell to close said opening, said means including a coil spring surrounding the piston rod, a compression nut threaded in the other end of the shell and coacting with said spring, the bore of said nut and the opening in the end of the shell being of relatively large diameter to permit of the vibration of the piston rod, means carried by the nut to prevent rotation thereof, and pressure actuated means interposed between the end face of the nut and the cylinder head and actuated by pressure from the cylinder entering the stuffing box to close the bore of the nut.

In testimony whereof I hereunto affix my signature in the presence of two witnesses.

WALTER N. LANDMESSER.

Witnesses:
CARL MAYER,
R. L. JACOBS.

Copies of this patent may be obtained for five cents each, by addressing the "Commissioner of Patents, Washington, D. C."